Patented June 10, 1930

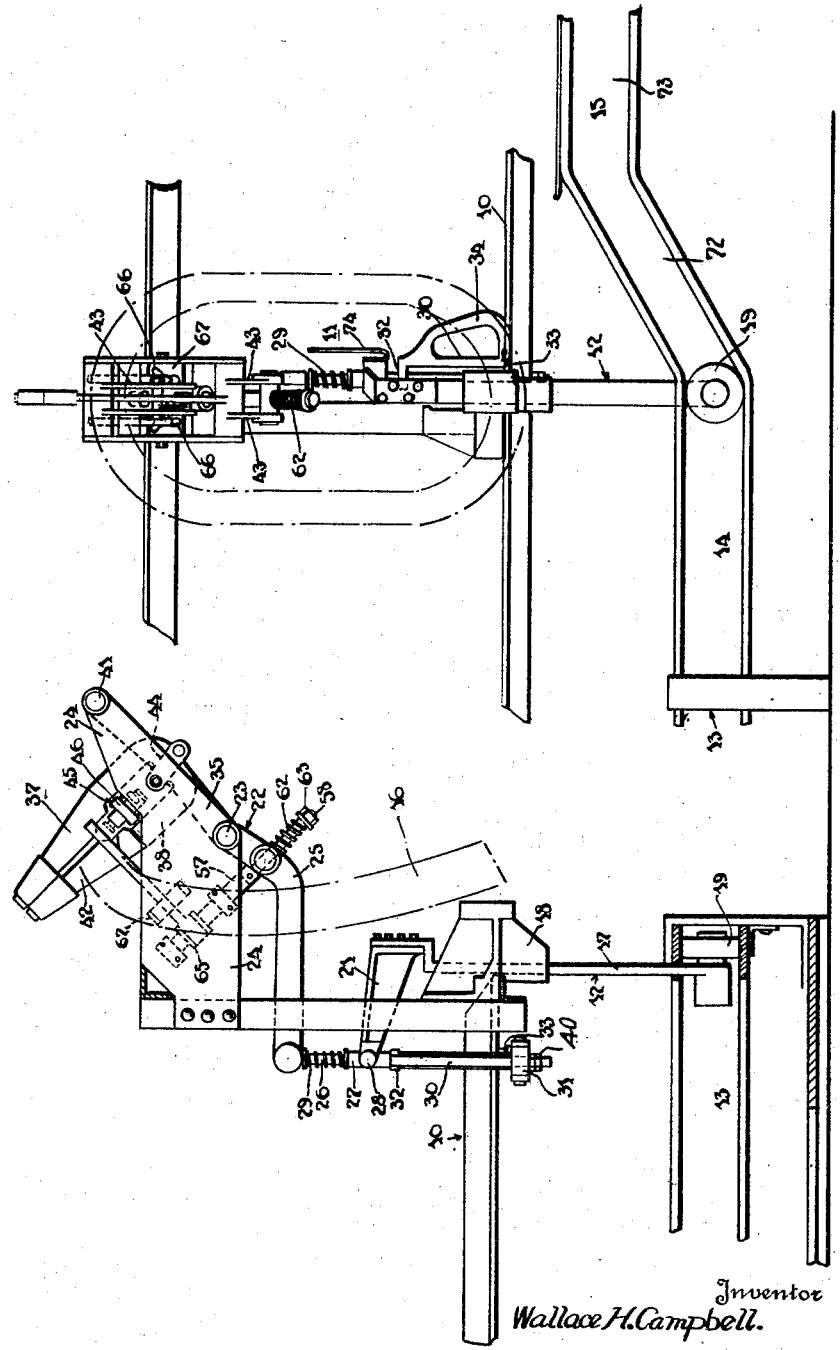

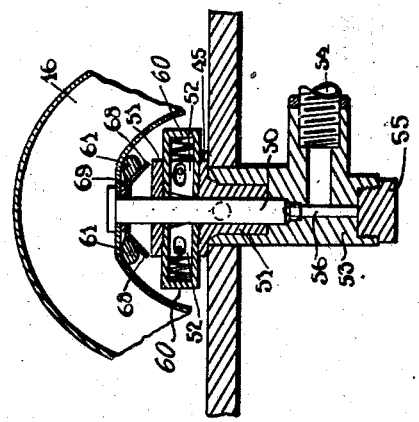
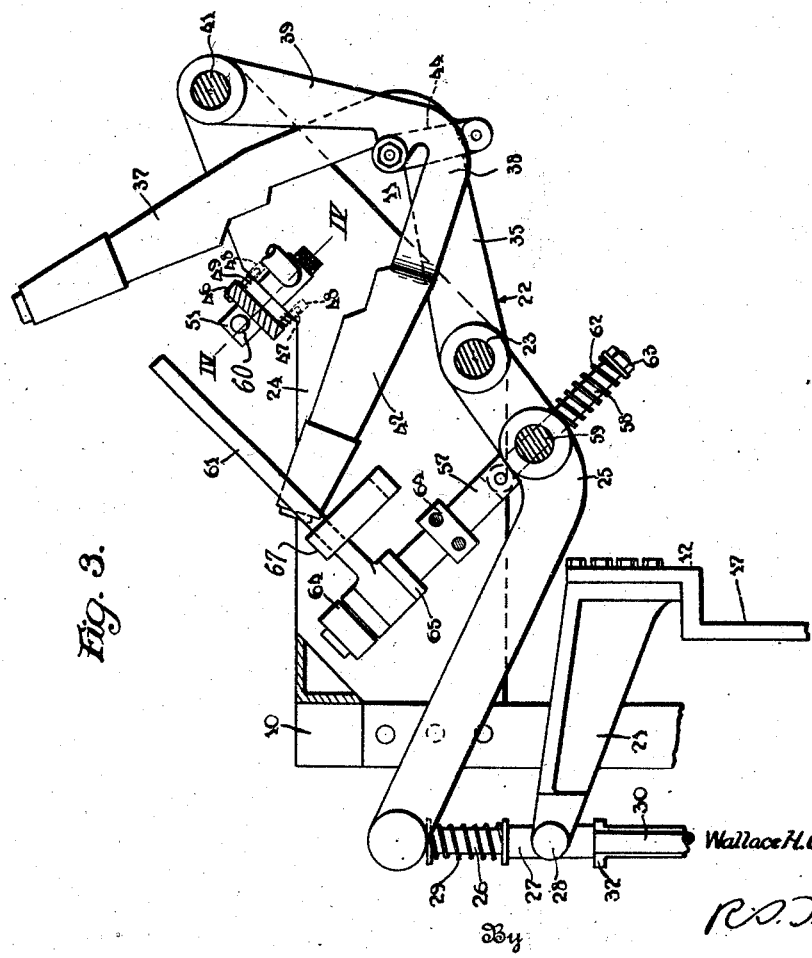

1,763,578

UNITED STATES PATENT OFFICE

WALLACE H. CAMPBELL, OF AKRON, OHIO, ASSIGNOR TO THE GOODYEAR TIRE & RUBBER COMPANY, OF AKRON, OHIO, A CORPORATION OF OHIO

DEFLATING MACHINE

Application filed December 15, 1927. Serial No. 240,225.

This invention relates to tire machines and it has particular relation to machines of the above designated character which shall be especially applicable for deflating inner tubes for pneumatic tire casings.

The invention involves improvements in the construction and method of operation of the individual units employed in tube deflating machines comprising a plurality of deflating units mounted upon a common carrier and successively operable by cam means common to all of the units.

In machines of this type, as at present employed, each unit includes a relatively stationary upper tube support and a relatively movable member for engaging the tube to stretch the latter by its movement during the deflating operation. Means for withdrawing the air from the tube is associated with the upper support and the tube is mounted upon the support with its valve disposed midway between the lateral edges of the tube and extends vertically downwardly into engagement with the air withdrawing means.

Straight built tubes, that is, tubes that have been formed on straight mandrels and consequently tend naturally to assume a cylindrical shape upon deflation, may be deflated satisfactorily by a machine of the above mentioned type. Curved built tubes, that is tubes that have been either formed or cured upon curved mandrels and consequently tend to assume a conical form when deflated, cannot, however, be satisfactorily deflated upon such machine.

Tubes formed or cured upon curved mandrels have non-uniform distribution of rubber therein and may be said to have a definite inner circumference and a larger definite outer circumference. The valve of such a tube is always connected thereto at some point along the smaller or inner circumference. When such a tube is mounted upon the horizontal tube support of the above mentioned machine, with its valve extending radially inwardly of the tube, and the tube is deflated, a surplus of material at the exterior surface of the tube results. In practice, this surplus material forms into wrinkles, varying in size according to the size of the tube, which render the tubes unfit for packaging and sale.

One object of this invention is to provide a novel method and apparatus for deflating tubes for pneumatic tires whereby wrinkling of the tubes is prevented.

Another object of the invention is to provide an apparatus for deflating tubes that have been formed or cured upon curved mandrels whereby wrinkling of the tubes during the deflating operation is prevented.

A further object of the invention is to provide an apparatus of the above designated character capable of substitution for deflating units in existing machines to render the latter capable of deflating all types and sizes of inner tubes for pneumatic tires.

For a better understanding of the invention, reference may now be had to the accompanying drawings forming a part of the specification, of which;

Fig. 1 is a side-elevational view of a portion of a deflating machine illustrating a tube deflating unit embodying the essential features of the invention;

Fig. 2 is a front elevational view thereof;

Fig. 3 is a side elevational view, on a larger scale, of a portion of the structure shown in Fig. 1, with the parts in different relative positions; and Fig. 4 is a sectional view, on a larger scale, taken substantially on the line IV—IV of Fig. 3.

In the particular embodiment of the invention illustrated in the accompanying drawings, a substantially circular frame 10, rotatably mounted at its center, by means not shown, supports a plurality of spaced tube deflating units 11 each including a roller carrying element 12 for engagement in a circular camway 13 which is stationary and disposed directly beneath the frame 10. The greater portion 14 of the camway 13 is disposed in the same horizontal plane and the ends of this portion are joined by an upwardly offset portion 15 which serves to successively actuate the roller carrying elements 12 of the individual units 11 upwardly to cause a temporary change in the relation of the parts of the unit to permit mounting of a tube 16 thereon.

Each roller carrying element 12 comprises a vertically disposed rod 17, slidably supported by a part 18 of the frame 10, which carries a cam roller 19 at its lower end and is provided at its upper end with a horizontally extending actuating arm 21.

A bell crank lever 22 is pivotally mounted, as indicated at 23, between a pair of spaced plates 24 constituting a part of the frame 10. One arm 25 of the lever 22 extends downwardly and laterally from the pivotal point 23 and has a depending rod 26 pivotally connected to the free end thereof. A collar 27 slidable upon the rod 26 is pivotally connected, as indicated at 28, to the free end of the arm 21. A coil spring 29 mounted on the rod with its ends in engagement with the arm 25 and the top of the collar 27 urges the latter toward its lowermost position.

A bracket 30, pivotally connected at its lower end to a block 31 slidably but non-rotatably mounted on the rod 26, is formed at its upper end with a lateral bifurcated extension 32 adapted to encircle a portion of the rod 26 and normally to support the collar 27 in a position substantially midway between the ends of the rod 26. Nuts 40 threaded upon the lower portion of the rod 26 support the block 31 and adjustably limit downward movement thereof. A spring 33, having one end secured to the block 31 and its other end secured to the bracket 30 at a point above its pivotal connection to the block, serves yieldingly to retain the bracket in an upright position beneath the collar 27. A handle 34, constituting an integral part of the bracket 30, is provided to permit manual rotation of the bracket about its pivot to disengage the extension 32 from the collar so that the rod 26 and the arm 25 may be raised independently of the element 12.

The other arm 35 of the bell crank lever 22 is of substantially L-shape and its longer portion constitutes a clamping jaw 37 which extends, under all conditions of the device, in a direction oblique to the horizontal. A member 38 of L-shape is pivotally connected at the end of its shorter portion 39, as indicated at 41, to the plates 24. The longer portion 42 of the member 38 constitutes a second clamping jaw designed to coact with the clamping jaw 37 to engage and hold the tube 16 in position to be deflated.

It will be observed that portions of the bell crank lever 22 and member 38 are composed of spaced elements 43 rather than of one solid element, in order that other portions of the apparatus may be interposed and moved between the spaced elements. One or more links 44 pivotally connect the member 38 to the lever 22 in order that movement of the latter may cause movement of the clamping jaw 42 to and from clamping position, the movement of a portion of the arm 35 being between the element 43 of the member 38.

A device 45 for withdrawing the air from a tube 16 is carried by the plates 24 in a position obliquely disposed to the horizontal and in alignment with the bite of the jaws. As shown, this device comprises a block 46 resiliently supported in spaced relation to the plates 24 by means of a plurality of bolts 47 fitting within apertures 48 and springs 49 mounted between the block and plates. The block 46 is centrally apertured to accommodate a valve receiving member 51 removably secured thereto.

The member 51 is centrally apertured to receive the valve 50 of the tube 16 and is provided with a pair of spring pressed plungers 52, which are confined within hollow cylindrical members 60 and are adapted to engage the valve to yieldingly retain it in position. The cylinders 60 are secured within the member 51. A fitting 53 of L-shape having an aperture in alignment with the aperture in the member 51 is adapted to be connected to a suction device (not shown) by means of a pipe 54. A plug 55 carrying a valve engaging pin 56 is threaded into the fitting 53 and may be adjusted to vary the position of the pin for different types of valves.

A shaft 57, pivotally connected at its lower end to an eye-bolt 58 traversing a pin 59 rotatably journalled in the elements 43 of the arm 25, adjustably supports a pair of rods 61. A coil spring 62, secured in position upon the eye-bolt 58 by means of a nut 63, serves normally to retain the shaft 57 in its lowermost position. The shaft 57 is slidably supported by spaced bearing members 64 extending between and secured to the plates 24.

The rods 61 which are pivotally mounted upon the shaft 57 and are adjustably positioned thereon by collar members 65, pass through spaced cam slots 66 formed in a cam plate 67 secured to the plates 24. The slots 66 are so shaped as to cause the free ends of the rods 61 to move apart during opening movement of the jaws and to move together to engage the flanges 68 of a spreader 69 mounted upon the valve 50. Downward movement of the arm 25 causes a similar movement of the rods 61 as the jaws 37 and 42 approach each other to force the valve 50 into engagement with the pin 56. It is to be noted that the springs 62 and 49 render the valve positioning means equally effective for valves of varying lengths.

In practising the invention, with the apparatus in the condition as shown in Figs. 1 and 2, the clamping jaws 37 and 42 are yieldingly maintained in closed condition by the arm 25, rod 26, collar 27, arm 21, rod 17 and roller 19, the latter being disposed in the horizontal portion 14 of the camway 13. As the frame 10 is rotated the roller 19 of the particular unit under consideration travels up an inclined portion 72 of the offset part 15 of the camway and causes a gradual elevation of the end of the arm 25 which causes movement of the clamping jaws to an open position, as shown in Fig. 3. At the same time the rods 61 move apart and away from the member 51 in response to movement of the shaft 57 and movement of the rods 61 in the cam slots 66.

An inflated tube 16 is then positioned on the clamping jaw 42 with its valve 50 extending obliquely downwardly in coacting relation with the device 45. The upper horizontal portion 73 of the offset part 15 of the camway 13 is of sufficient length to permit removal of one tube and application of another tube to the unit before the closing movement of the clamping jaws is started. Movement of the roller 19 down an inclined portion (not shown) of the camway 13 to the lower horizontal portion 14 thereof causes the clamping jaws 37 and 42 to clamp the tube between them. As the roller 19 moves from the upper to the lower level the rods 61 engage the spreader 69 and thereby move the valve into operative position as the clamping jaws 37 and 42 are moved toward each other.

It is to be noted that the connection between the cam means and the clamping jaws is positive in its action and is rendered resilient by employment of the spring 29 on the rod 26. For this reason, it is necessary to provide means whereby the clamping jaws may be released from control of the cam means to permit manual operation thereof. For example, if the clamping jaws in their closing movement should engage a portion of the body or of the garments of an operator, it would be necessary for the operator to walk almost completely around the machine before the jaws could be opened and release obtained. In such event the bracket 30 may be rocked on its pivot by means of the handle 34 which action releases the collar 27 and thereby permits manual opening of the jaws 37 and 42 independently of the cam actuated means.

In order to insure proper return of the bracket to its normal position after such an operation, a guide member 74 is provided to prevent the bifurcated portion 32 of the bracket 30 from engaging with any of the machine parts upon downward movement of the rod and the bracket. The tube 16 is fully deflated during movement of the unit on which it is mounted about the machine and may be removed and another tube substituted while the jaws are maintained in an open condition by the cam means.

The tendency of the tube material to close the valve during deflation, and thereby increase the time required for deflation, which results from the present practice of so arranging the tube that its valve extends radially inwardly thereof, is obviated by this invention. As the air is drawn from the tube the latter flattens out in a plane in alinement with the axis of the valve and closing action of the jaws flexes the valve patch to substantially cup form adjacent the valve. Inward movement of the rods 61 after the initial engagement of the jaws with the upper portion of the tube also tends to prevent the tube material from closing the valve.

It is believed to be novel to cause deflation of a tube without subjecting it to a stretching action during the deflating operation. It is also believed to be novel to effect the deflation of a tube, which has been formed or cured on a curved mandrel, by freely suspending the tube on a support disposed obliquely to the horizontal, which causes deflation without the formation of wrinkles or plaits in the tube.

Although I have illustrated only one form which my invention may assume and have described in detail only a single application thereof, it will be apparent to those skilled in the art that the invention is not so limited, but that various minor modifications may be made therein without departing from the spirit of the invention or from the scope of the appended claims.

What I claim is:

1. A tube deflating apparatus including a frame, a pair of jaws pivotally connected to the frame, said jaws in closed position meeting in a plane oblique to the horizontal.

2. A tube deflating machine including a frame, a clamping jaw connected to the frame, a second clamping jaw pivotally connected thereto and automatic means for periodically moving one of the jaws relative to the other.

3. A tube deflating machine including a frame, a clamping jaw connected to the frame, a second clamping jaw pivotally connected thereto, automatic means for periodically moving one of the jaws relative to the other and means for rendering the automatic means inoperative to permit manual movement of one of the jaws.

4. A tube deflating apparatus including a frame, a pair of jaws pivotally connected to the frame, said jaws in closed position meeting in a plane oblique to the horizontal and means disposed between the jaws in the closed condition thereof for engagement by the valve of a tube to deflate the tube while it is suspended from the jaws.

5. A tube deflating apparatus including a frame, a pair of jaws pivotally connected to the frame, means disposed between the jaws in the closed condition thereof for engagement by the valve of a tube to deflate the tube while it is suspended from the jaws and means for periodically moving one of the jaws.

6. A tube deflating machine comprising a frame including a camway, a pair of clamping jaws pivotally connected to the frame, a link pivotally connecting the jaws, a rod pivotally connected to the end of one of the jaws, a collar slidably mounted on the rod, a coil spring mounted on the rod to limit movement of the collar in one direction and means connecting the collar to a member traveling in the camway to actuate the clamping jaws.

7. A tube deflating machine comprising a frame, a pair of clamping jaws pivotally connected to the frame, a link pivotally connecting the jaws, a rod pivotally connected to the end of one of the jaws, a collar slidably mounted on the rod, a coil spring mounted on the rod to limit movement of the collar in one direction and means to actuate the clamping jaws.

8. A tube deflating machine comprising a frame including a camway, a pair of clamping jaws pivotally connected to the frame, a link pivotally connecting the jaws, an extension on one of the jaws and means including a member movable in the camway for actuating the jaws.

9. A tube deflating machine comprising a frame, a pair of clamping jaws pivotally connected to the frame, a link pivotally connecting the jaws, an extension on one of the jaws and means connected to the extension for actuating the jaws.

In witness whereof, I have hereunto signed my name.

Signed at Akron, in the county of Summit and State of Ohio, this 14th day of December, 1927.

WALLACE H. CAMPBELL.